United States Patent
Qi et al.

(10) Patent No.: US 9,662,637 B2
(45) Date of Patent: May 30, 2017

(54) NANO-STRUCTURED COMPOSITE ABSORBER FOR AIR DETOXING AND DEODORING

(71) Applicants: Xiwang Qi, Scottsdale, AZ (US); Mei Jiang, Scottsdale, AZ (US)

(72) Inventors: Xiwang Qi, Scottsdale, AZ (US); Mei Jiang, Scottsdale, AZ (US)

( * ) Notice: Subject to any disclaimer, the term of this patent is extended or adjusted under 35 U.S.C. 154(b) by 263 days.

(21) Appl. No.: 14/523,946

(22) Filed: Oct. 27, 2014

(65) Prior Publication Data

US 2015/0126357 A1    May 7, 2015

Related U.S. Application Data

(60) Provisional application No. 61/897,826, filed on Oct. 31, 2013.

(51) Int. Cl.
| | | |
|---|---|---|
| B01J 20/22 | (2006.01) |
| B01J 23/50 | (2006.01) |
| B01J 21/18 | (2006.01) |
| B01J 23/10 | (2006.01) |
| B01J 29/08 | (2006.01) |
| B01J 29/18 | (2006.01) |
| B01J 29/40 | (2006.01) |
| B01J 29/70 | (2006.01) |
| B01J 23/745 | (2006.01) |
| B01J 23/75 | (2006.01) |
| B01J 23/755 | (2006.01) |
| B01J 23/72 | (2006.01) |
| B01J 23/06 | (2006.01) |
| B01J 23/34 | (2006.01) |
| B01J 23/04 | (2006.01) |
| B01J 21/06 | (2006.01) |
| B01J 23/42 | (2006.01) |
| B01J 23/44 | (2006.01) |
| B01J 23/46 | (2006.01) |
| B01J 29/20 | (2006.01) |
| B01J 29/42 | (2006.01) |
| B01J 29/72 | (2006.01) |
| B01D 53/00 | (2006.01) |

(52) U.S. Cl.
CPC .......... *B01J 23/50* (2013.01); *B01J 21/063* (2013.01); *B01J 21/18* (2013.01); *B01J 23/04* (2013.01); *B01J 23/06* (2013.01); *B01J 23/10* (2013.01); *B01J 23/34* (2013.01); *B01J 23/42* (2013.01); *B01J 23/44* (2013.01); *B01J 23/462* (2013.01); *B01J 23/464* (2013.01); *B01J 23/72* (2013.01); *B01J 23/745* (2013.01); *B01J 23/75* (2013.01); *B01J 23/755* (2013.01); *B01J 29/082* (2013.01); *B01J 29/18* (2013.01); *B01J 29/20* (2013.01); *B01J 29/40* (2013.01); *B01J 29/42* (2013.01); *B01J 29/7003* (2013.01); *B01J 29/7007* (2013.01); *B01J 29/7207* (2013.01); *B01J 29/7215* (2013.01); *B01D 53/00* (2013.01)

(58) Field of Classification Search
USPC .................................. 422/122; 502/401, 400
See application file for complete search history.

(56) References Cited

U.S. PATENT DOCUMENTS

| | | | | |
|---|---|---|---|---|
| 4,604,110 A * | 8/1986 | Frazier | ...................... | A61L 9/00 422/122 |
| 4,793,837 A * | 12/1988 | Pontius | .................. | B01D 53/02 427/244 |
| 6,096,299 A * | 8/2000 | Guarracino | ......... | A61F 13/8405 424/402 |
| 6,680,028 B1 * | 1/2004 | Harris | ....................... | A61L 9/16 422/122 |
| 6,680,279 B2 * | 1/2004 | Cai | ........................ | B01D 53/94 502/303 |
| 6,773,477 B2 * | 8/2004 | Lindsay | ............. | B01D 46/0023 353/13 |
| 7,160,360 B2 * | 1/2007 | Wu | ........................ | B01D 53/02 95/117 |
| 7,419,516 B1 * | 9/2008 | Seal | ........................ | B82Y 30/00 44/301 |
| 8,746,254 B2 * | 6/2014 | Luan | ....................... | A24D 3/163 131/207 |
| 2004/0044262 A1 * | 3/2004 | Yang | ....................... | B01J 20/186 585/823 |
| 2006/0094595 A1 * | 5/2006 | Labarge | ............... | B01D 53/945 502/325 |
| 2006/0251609 A1 * | 11/2006 | Sojka | ....................... | A61L 9/014 424/76.1 |
| 2008/0302713 A1 * | 12/2008 | Patrick | .................. | B01D 65/08 210/234 |
| 2013/0040804 A1 * | 2/2013 | Ladrech | ................ | B01D 53/02 502/74 |

* cited by examiner

*Primary Examiner* — Nina Bhat
(74) *Attorney, Agent, or Firm* — Michael W. Goltry; Robert A. Parsons; Parsons & Goltry

(57) ABSTRACT

Described is related to a nano-structured composite absorber for air detoxing and deodoring at ambient temperature to prevent harmful chemicals in the air from damaging human health. The nano-structured composite absorber consists of nano-porous carbon, zeolites with nano-sized pores and at least 1 other component chosen from nano-porous rare earth oxides and nano-sized catalysts. The synergetic action of those nano-structured components can effectively remove toxic chemicals including, but not limited to formaldehyde, benzene, toluene, xylene, propene, butadiene, acetone, carbon monoxide, nitric oxide, nitrogen dioxide, sulfur dioxide, hydrogen sulfide, ammonia, alcohols, chlorine, mercaptans, as well as malodors, such cigarette smoke, net/fish/poultry odors and bathroom/toilet smells.

12 Claims, No Drawings

NANO-STRUCTURED COMPOSITE ABSORBER FOR AIR DETOXING AND DEODORING

CROSS-REFERENCE TO RELATED APPLICATION

This application claims priority of Provisional Application Ser. No. 61/897,826 filed in the United States Patent and Trademark Office on Oct. 31, 2013, and which addresses the same subject matter.

FIELD OF THE INVENTION

This invention is related to a nano-structured composite absorber used for removing toxic chemicals and bad odors from air, especially in enclosed spaces to maintain a clean living atmosphere.

BACKGROUND OF THE INVENTION

People spend majority of the time daily in enclosed spaces, like cars, buses, bedrooms, offices, schools, workshops, ship cabins and compartments, etc., and are increasingly aware that the invisible harmful chemicals existing in the air of enclosed spaces are threatening their health and impacting their life quality. US EPA estimates Indoor air pollution is two to five times worse (sometimes a 100× worse) than the air outdoors. For examples, chemicals emitted from vehicle engine exhaust, gas stoves, fireplaces, household paints, cleaning and pesticide sprays, plastic wallpapers, polymer foams, adhesives, furniture, carpets, as well as bad odors from kitchen waste, bathrooms, toilets, pets, smokes, diesel and gasoline fumes, etc., often include those harmful substances like formaldehyde, benzene, toluene, xylene, carbon monoxide, nitric oxide, nitrogen dioxide, ammonia, sulfur dioxide, hydrogen sulfide, alcohols, chlorine, propene, butadiene, acetone, mercaptans, etc. These chemicals can easily accumulate to higher concentration in the enclosed spaces due to restricted ventilation. Exposure to those chemicals can cause common ailments such as headaches, coughs, nausea, dizziness, fatigue, depression; prolonged inhaling can cause permanent damage to the lungs, liver, brain and other body systems. Children are more susceptible to environmental exposures than adults and, because of their developing systems, particularly vulnerable to the toxic chemicals' detrimental effect on their growth. For example, benzene, often found in new carpets, is a known cause of leukemia; formaldehyde, widely used in insulation foam, disinfectants and pressed kitchen cabinets, is classified as a human carcinogen by International Agency for Research on Cancer (IARC); 1,3-butadiene, often found in automobile exhaust and cigarette smoke, is also listed as a known carcinogen by the Agency for Toxic Substances Disease Registry and the US EPA. Clearly there is a need to tackle this indoor air pollution problem which affects millions of people's health.

DESCRIPTION OF THE PRIOR ART

Common household air purifiers on the market such as Honeywell and Blueair brands employ HEPA filters to trap dust and small particles; Febreze®, Glade® and Air Wick® products use chemical fragrances to cover up harmful chemical smells and bad odors. All of these however do not remove the toxic chemical molecules from the air. Therefore the health threats still exist.

Activated carbon and zeolite materials in the form of granules and powders were used for a variety pollution control applications based on their surface capability to adsorb pollutant molecules. U.S. Pat. No. 7,160,360, US Patent Application 20040044262 used both activated carbon and zeolite in the petrochemical industry to clean impurities from hydride gases and liquid fuels. U.S. Pat. No. 8,746,254 disclosed a cigarette filter with activated carbon and zeolite particles to remove toxic substances such as acroleins and butadiene. U.S. Pat. No. 4,604,110, U.S. Pat. No. 4,793,837, U.S. Pat. No. 6,096,299 used activated carbon and zeolite for odor controls. U.S. Pat. No. 8,507,407 disclosed an air purificant made from carbon powder, attapulgite, sepiolite, zeolite, cationic surfactant, pore-forming agent, and bamboo vinegar. U.S. Pat. No. 6,773,477 described a portable motor vehicle cabin air purifier including a packed bed filter containing desiccant, and carbon particles and catalyst. U.S. Pat. No. 6,680,028 described an air filter with activated charcoal, potassium permanganate, potassium hydroxide, etc. US Patent Application 20130040804 disclosed a passenger vehicle air filter containing granular activated carbon and Fe exchanged zeolite.

However, those air filters or purifiers in the prior arts which are mainly focused on trapping particles, are incapable to deal with wide range of common toxic chemicals encountered in enclosed spaces, such as carbon monoxide, sulfur dioxide, nitrogen oxides, hydrogen sulfide, ammonia, formaldehyde, benzene, butadiene, etc., due to limited capability and surface area capacity of powder or granules form of activated carbon and zeolite, either in packed bed with high pressure drop or embedded in the sheet-type particle filters.

Thus it would be highly desirable to have a dedicated toxic chemical air purifying device with truly effective functional materials, high geometric surface and low pressure drop to efficiently purifying the air in enclosed spaces.

This invention provides such a toxic chemical absorber in nano-structured composite format with multiple functional components working in a synergetic mode, made into highly efficient monolith configurations with high geometric surface and low resistance flow channels to maximize the removal of toxic chemicals from air.

SUMMARY OF THE INVENTION

This invention is related to a nano-structured composite absorber for removing toxic chemicals and malodors from air. The nano-structured composite material consists of nano-porous carbon, zeolites with sub nano-size pores and at least 1 other component chosen from nano-porous rare earth oxides and nano-sized catalysts, and is made into highly efficient monolith configurations with high geometric surface and low resistance air flow channels. The synergetic action of those nano-structured components effectively removes toxic chemicals including, but not limited to formaldehyde, benzene, toluene, xylene, propene, butadiene, acetone, carbon monoxide, nitric oxide, nitrogen dioxide, sulfur dioxide, hydrogen sulfide, ammonia, alcohols, chlorine, mercaptans, etc., as well as malodors including cigarette smoke, alcoholic beverages, body odors, bathroom/toilet smells, sewer odors, garlic/onion odors, rotten/burned food, diesel/gasoline fumes, paint odors, moth balls, pet/fish/poultry odors, etc.

DETAILED DESCRIPTION OF THE INVENTION

This invention is related to a nano-structured composite absorber, which consists of nano-porous carbon, zeolites with sub nano-size pores and at least 1 other component chosen from nano-porous rare earth oxides and nano-sized catalysts. This composite absorber is made into configurations with high geometric surface area exposed to air flow and can effectively remove toxic chemicals from air.

In one embodiment, nano-porous carbon, zeolite and rare earth oxide powders are mixed together with liquid binders and pore formers into a paste or slurry, followed by extrusion or tape-casting or molding to forms of various shapes, then followed by drying and calcination. In this way, the nano-porous carbon, zeolite and rare earth oxide are integrated into a nano-structured composite form with highly macro-porous channels for synergetic trapping of the toxic chemicals and heavy odors. Additionally, nano-sized catalysts are integrated in the formed nano-structured composite to facilitate the adsorption of toxic chemical molecules and conversion into water vapor and carbon dioxide. More specifically, the composite absorber is made by either extrusion into honeycomb monolith; or by tape-casting into sheets and laminating into corrugated stacks; or by rolling sheets into round cylinder shapes; or by molding into various shapes, like ball, cylinder, cube, cone, pyramid, and hexagonal prism with foam-type porous structure after calcination. Liquid binders are chosen from viscous cellulose aqueous solution, molasses, epoxy resin, phenolic resin, polysulfone, polyacrylonitrile and polyacrylamide solutions in dimethylformamide or dimethylacetamide, and or inorganic sol such as $SiO_2$ and boehmite. The non-limiting examples of suitable pore formers include cellulose powder, polyethylene powder, corn starch, potato starch.

In another embodiment, nano-porous carbon is formed first from liquid form carbon precursors, then the carbon is coated with zeolite and rare earth oxides to form the nano-structured composite. Liquid carbon precursors are first mixed with fillers and pore-forming materials, followed by extrusion or tape-casting or molding to forms of various shapes, then followed by drying, carbonizing and activation, thereby forming a highly porous monolith carbon structure. This carbon structure is then coated with slurry of zeolite and rare earth oxides, followed by drying and calcination, thereby forming an integrated nano-structured composite. The non-limiting examples of suitable fillers include $SiO_2$, $Al_2O_3$, SiC, aluminosilicate and cordierite powders. The non-limiting examples of suitable pore formers include cellulose powder, polyethylene powder, corn starch, potato starch. In another embodiment, the highly porous monolith carbon structure is formed by dipping porous ceramic supports in liquid carbon precursors, followed by drying, carbonizing and activation, thereby forming a highly porous monolith carbon structure on ceramic supports. This carbon coated structure is then coated with slurry of zeolite and rare earth oxides, followed by drying and calcination, thereby forming an integrated nano-structured composite. Additionally, nano-sized catalysts are added-integrated in the formed nano-structured composite to facilitate the adsorption and conversion of toxic chemical molecules. The non-limiting examples of ceramic supports include ceramic foams and honeycomb ceramic monolith substrates made of $Al_2O_3$, $SiO_2$, aluminosilicate, cordierite, mullite, SiC.

Nano-porous carbon powder can be derived physically or chemically from raw materials chosen from bamboo charcoal, coconut shell charcoal, willow bark charcoal, and carbon containing resins, such as furan resin and phenolic resin. The liquid carbon precursors area chosen from epoxy resin, phenolic resin, Furan resin, etc. Phenolic resin is preferred due to its high carbon yield. The zeolite are chosen from the group consisting of 3A, 4A, 5A and 13X, and Beta, Pentasil, Mordenite zeolites, etc. Zeolite type with hydrophobic property is preferred with Si to Al ratio in the range of 15 to 150. More preferably, the Si to Al ration is from 50-120. The rare earth oxides are chosen from the group including yttrium oxide, lanthanum oxide, cerium oxide, praseodymium oxide, samarium oxide, and rare earth doped oxides, such as yttria-zirconia and ceria-zirconia. The nano-sized catalysts are chosen from the group including Fe, Co, Ni, Cu, Zn, Mn, Na, K, Ba, Ti, Pt, Pd, Rh, Ag, Ru, Ce and their corresponding metal oxides. The metal and metal oxides catalysts could be integrated into the composite material after its formation, or pre-loaded in the form of nano-particles supported on the zeolite particles or rare earth oxide particles or carbon particles.

When liquid form carbon precursors are used, a process is involved to convert into highly porous nano-structured continuous carbon phase, which includes drying, carbonizing and activation steps. In one embodiment, porous ceramic supports such as ceramic foams or honeycomb ceramic monolith substrates are dipped in the liquid carbon precursor, dried at 50° C. to 160° C., carbonized at 500° C. to 900° C., and activated at 500° C. to 900° C. by agent of $H_2O$ vapor or $CO_2$. In another embodiment, the liquid carbon precursor is mixed with fillers and pore-forming materials into slurry and is tape-casted onto non-woven cloth roll, then dried at 50° C. to 160° C., carbonized at 400° C. to 900° C. and activated at 500° C. to 900° C. by agent of $H_2O$ vapor or $CO_2$. The activated and continuous carbon roll is then applied with zeolites and rare earth oxides coating and cut into sheets of proper length, which are stacked onto each other with corrugated sheets in between to form air channels.

The invention claimed is:

1. A nano-structured composite absorber for removing toxic chemical pollutants and malodors from air at ambient temperature comprising nano-porous carbon and zeolites with nano-sized pores and at least 1 component selected from the group consisting of nano-porous rare earth oxides and nano-sized catalysts.

2. The nano-structured composite absorber of claim 1, wherein said nano-porous carbon has BET surface area from 800 $m^2$/g to 3500 $m^2$/g and is derived from raw materials selected from the group consisting of bamboo charcoal, coconut shell charcoal, willow bark charcoal, and liquid form carbon precursors.

3. The nano-structured composite absorber of claim 2, wherein said liquid form carbon precursors are selected from epoxy resin, phenolic resin and Furan resin.

4. The nano-structured composite absorber of claim 1, wherein said zeolites are selected from the group consisting of 3A zeolite, 4A zeolite, 5A zeolite, 13X zeolite, Beta zeolite, Pentasil zeolite, Mordenite zeolite, and combinations thereof.

5. The nano-structured composite of claim 1, wherein said rare earth oxides are selected from the group consisting of yttrium oxide, lanthanum oxide, cerium oxide, praseodymium oxide, samarium oxide, rare earth doped oxides including yttrium doped-zirconium oxide and cerium doped zirconium oxide, and combinations thereof.

6. The nano-structured composite of claim 1, wherein said nano-sized catalysts are selected from the group consisting of iron, cobalt, nickel, copper, zinc, manganese, sodium, potassium, barium, titanium, platinum, palladium, rhodium, ruthenium, silver, and their corresponding oxides and combinations thereof.

7. The nano-structured composite absorber of claim 1, wherein said toxic chemical pollutants include formaldehyde, benzene, toluene, xylene, propene, butadiene, acetone, carbon monoxide, nitric oxide, nitrogen dioxide, sulfur dioxide, hydrogen sulfide, ammonia, alcohols and mercaptans.

8. The nano-structured composite absorber of claim 1, wherein said malodors include cigarette smoke, alcoholic beverages, body odors, bathroom/toilet smells, sewer odors, garlic/onion odors, rotten/burned food, diesel/gasoline fumes, paint odors, moth balls, pet/fish/poultry odors.

9. The nano-structured composite absorber of claim 1, wherein said ambient temperature is in the range of −5° C. to 40° C.

10. A nano-structured composite absorber comprising a body of honeycomb monolith with multiple parallel air flow through channels, or a monolith foam with tortuous air flow through channels, or multi-stacked bodies of honeycomb monolith, or multi-stacked bodies of monolith foam, or combinations thereof, wherein said monolith has nano porous carbon integrated intimately with other components including zeolite, nano-porous rare earth oxides, and/or nano-sized catalysts, and/or nano-sized catalysts supported on nano-porous rare earth oxides, and filler materials.

11. The nano-structured composite absorber of claim 10, wherein said monolith with air flow through channels has a channel/cell number density of 200 to 900 per square inch.

12. The nano-structured composite absorber of claim 10, wherein said filler materials are selected from the group consisting of $Al_2O_3$, $SiO_2$, aluminosilicate, cordierite, mullite, SiC, or combinations thereof.

* * * * *